United States Patent
Sakaguchi et al.

(10) Patent No.: US 11,655,894 B2
(45) Date of Patent: May 23, 2023

(54) SHIFT RANGE CONTROL DEVICE

(71) Applicant: DENSO CORPORATION, Kariya (JP)

(72) Inventors: Koji Sakaguchi, Kariya (JP); Jun Yamada, Kariya (JP); Haruka Miyano, Kariya (JP)

(73) Assignee: DENSO CORPORATION, Kariya (JP)

( * ) Notice: Subject to any disclaimer, the term of this patent is extended or adjusted under 35 U.S.C. 154(b) by 127 days.

(21) Appl. No.: 17/443,407

(22) Filed: Jul. 26, 2021

(65) Prior Publication Data

US 2021/0348683 A1 Nov. 11, 2021

Related U.S. Application Data

(63) Continuation of application No. PCT/JP2020/001406, filed on Jan. 17, 2020.

(30) Foreign Application Priority Data

Jan. 28, 2019 (JP) .............................. JP2019-011911

(51) Int. Cl.
| | |
|---|---|
| *B60T 17/18* | (2006.01) |
| *F16H 61/32* | (2006.01) |
| *F16H 61/02* | (2006.01) |
| *H02K 1/2753* | (2022.01) |
| *H02P 3/18* | (2006.01) |
| *H02P 6/16* | (2016.01) |
| *H02P 6/28* | (2016.01) |
| *H02K 1/14* | (2006.01) |

(52) U.S. Cl.
CPC ......... *F16H 61/32* (2013.01); *F16H 61/0202* (2013.01); *H02K 1/2753* (2013.01); *H02P 3/18* (2013.01); *H02P 6/16* (2013.01); *H02P 6/28* (2016.02); *F16H 2061/326* (2013.01); *H02K 1/14* (2013.01)

(58) Field of Classification Search
CPC ...... B60T 17/18; F16H 61/32; F16H 61/0202; F16H 2061/326; H02K 1/2753; H02P 3/18; H02P 6/16
See application file for complete search history.

(56) References Cited

U.S. PATENT DOCUMENTS

| | | | | |
|---|---|---|---|---|
| 2013/0154537 A1* | 6/2013 | Kimura | .............. | G05B 13/0265 318/561 |
| 2017/0197605 A1* | 7/2017 | Wako | ..................... | B60T 17/18 |
| 2019/0353242 A1 | 11/2019 | Kamio | | |

* cited by examiner

*Primary Examiner* — Cortez M Cook
(74) *Attorney, Agent, or Firm* — Nixon & Vanderhye P.C.

(57) ABSTRACT

A shift range control device switches a shift range by controlling drive of a motor. An angle calculation unit calculates a motor angle based on a signal from a rotation angle sensor that detects a rotation position of the motor. A drive control unit drives the motor so that the motor angle becomes a target angle according to the target shift range, and stops a rotor by a fixed phase energization, when the motor angle reaches a target angle. When the rotor vibrates with respect to stop position, the drive control unit maintains a state in which a brake torque, which is the torque generated when moving away from center of vibration, is larger than an acceleration torque, which is the torque generated when moving toward the center of vibration, and reduces the current that energizes the motor based on a difference between the brake torque and the acceleration torque.

8 Claims, 14 Drawing Sheets

FIG. 8

| ELAPSED TIME X [ms] | 0 | 25 | 50 | 75 | 100 |
|---|---|---|---|---|---|
| DUTY VALUE Df [%] | 20 | 10 | 5 | 2.5 | 0 |

SHIFT RANGE CONTROL DEVICE

CROSS REFERENCE TO RELATED APPLICATION

This application is a continuation application of International Patent Application No. PCT/JP2020/001406 filed on Jan. 17, 2020, which designated the U.S. and based on and claims the benefits of priority of Japanese Patent Application No. 2019-011911 filed on Jan. 28, 2019. The entire disclosure of all of the above applications is incorporated herein by reference.

TECHNICAL FIELD

The present disclosure relates to a shift range control device.

BACKGROUND

There has hitherto known a shift range control device that switches a shift range by controlling a motor in response to a shift range switching request from a driver.

SUMMARY

An object of the present disclosure is to provide a shift range control device capable of appropriately stopping a motor at a target position.

A shift range control device of the present disclosure switches a shift range by controlling drive of a motor, and includes an angle calculation unit and a drive control unit. The angle calculation unit calculates a motor angle based on a signal from a rotation angle sensor that detects a rotation position of the motor. The drive control unit drives the motor so that the motor angle becomes a target angle according to the target shift range, and stops a rotor by a fixed phase energization control when the motor angle reaches a target angle. When the rotor vibrates with respect to a stop position according to the energized phase during the fixed phase energization control, the drive control unit maintains a state in which a brake torque, which is the torque generated when moving away from a center of vibration, is larger than an acceleration torque, which is the torque generated when moving toward the center of vibration, and reduces the current that energizes the motor based on a difference between the brake torque and the acceleration torque.

BRIEF DESCRIPTION OF DRAWINGS

The above and other objects, features and advantages of the present disclosure will become more apparent from the following detailed description taken in conjunction with the accompanying drawings. In the drawings:

FIG. 8 is a calculation map of a duty value at the time of fixed phase energization according to the first embodiment.

DETAILED DESCRIPTION

In an assumable example, there has hitherto known a shift range control device that switches a shift range by controlling a motor in response to a shift range switching request from a driver. When an angle deviation, which is a difference between a target count value and an actual count value, becomes smaller than an angle determination threshold value, a sudden braking control with fixed duty is switched to. When a reversal of a motor is determined, the control is switched to a fixed phase energization control and the motor is stopped.

For example, if a resolution of a detector that detects a rotation angle of the motor is rough, when a reversal of the motor is detected, it may have already been accelerated considerably in an opposite direction. Therefore, the amount of energization required to stop the motor may increase. An object of the present disclosure is to provide a shift range control device capable of appropriately stopping a motor at a target position.

A shift range control device of the present disclosure switches a shift range by controlling drive of a motor, and includes an angle calculation unit and a drive control unit. The angle calculation unit calculates a motor angle based on a signal from a rotation angle sensor that detects a rotation position of the motor. The drive control unit drives the motor so that the motor angle becomes a target angle according to the target shift range, and stops a rotor by a fixed phase energization control when the motor angle reaches a target angle. When the rotor vibrates with respect to a stop position according to the energized phase during the fixed phase energization control, the drive control unit maintains a state in which a brake torque, which is the torque generated when moving away from a center of vibration, is larger than an acceleration torque, which is the torque generated when moving toward the center of vibration, and reduces the current that energizes the motor based on a difference between the brake torque and the acceleration torque. As a result, the motor can be appropriately stopped at the target position.

Hereinafter, a shift range control device according to the present disclosure will be described with reference to the drawings. Hereinafter, in a plurality of embodiments, a substantially equivalent configuration will be denoted by an identical reference, and explanation thereof will be omitted.

First Embodiment

Figure 1:
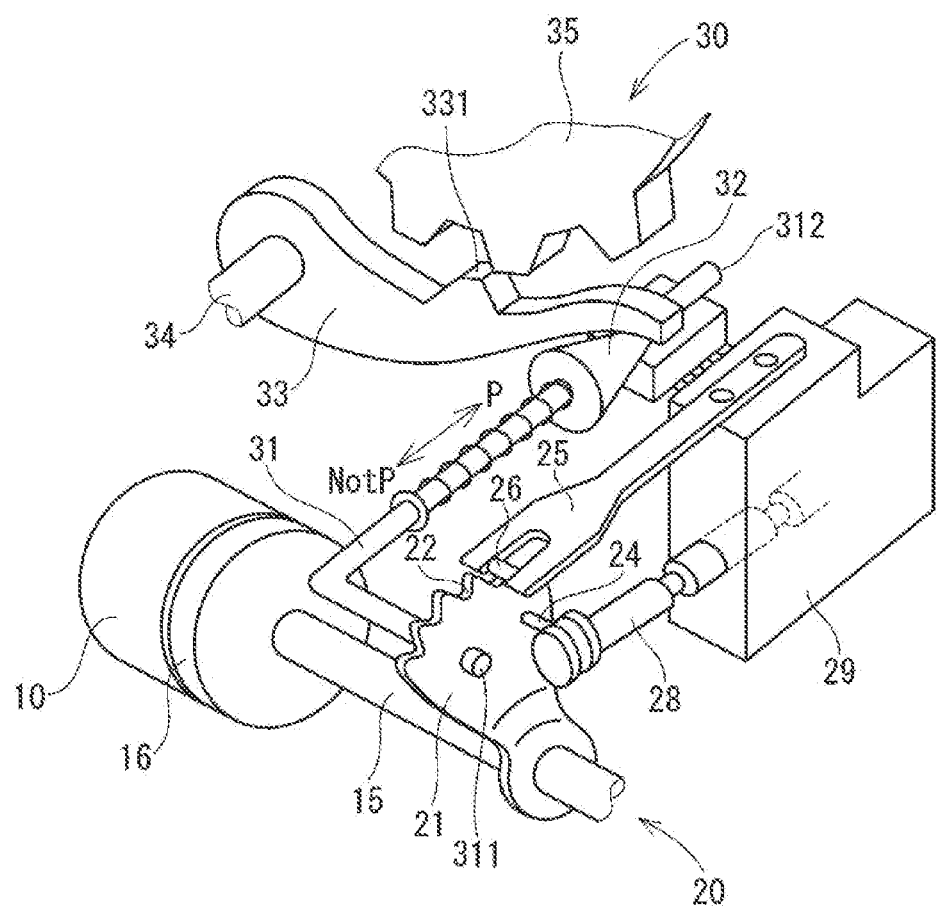
FIG. 1 is a perspective view showing a shift-by-wire system according to a first embodiment.
Figure 2:
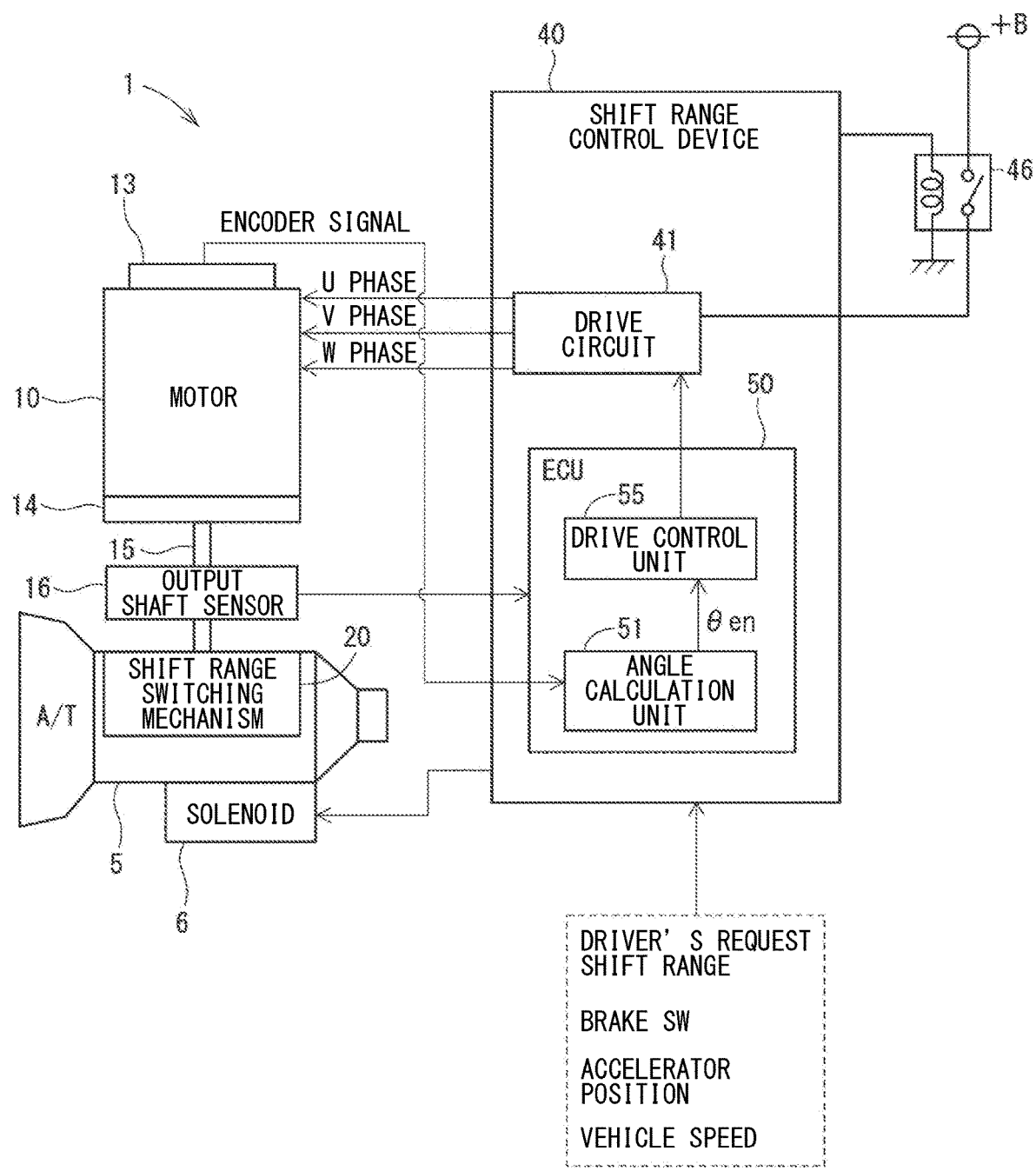
FIG. 2 is a diagram showing a schematic configuration of a shift-by-wire system according to the first embodiment.

The first embodiment is shown in FIGS. 1 to 9. As shown in FIGS. 1 and 2, a shift-by-wire system 1 includes, for example, a motor 10, a shift range switching mechanism 20, a parking lock mechanism 30, and a shift range control device 40, and the like.

Figure 3:
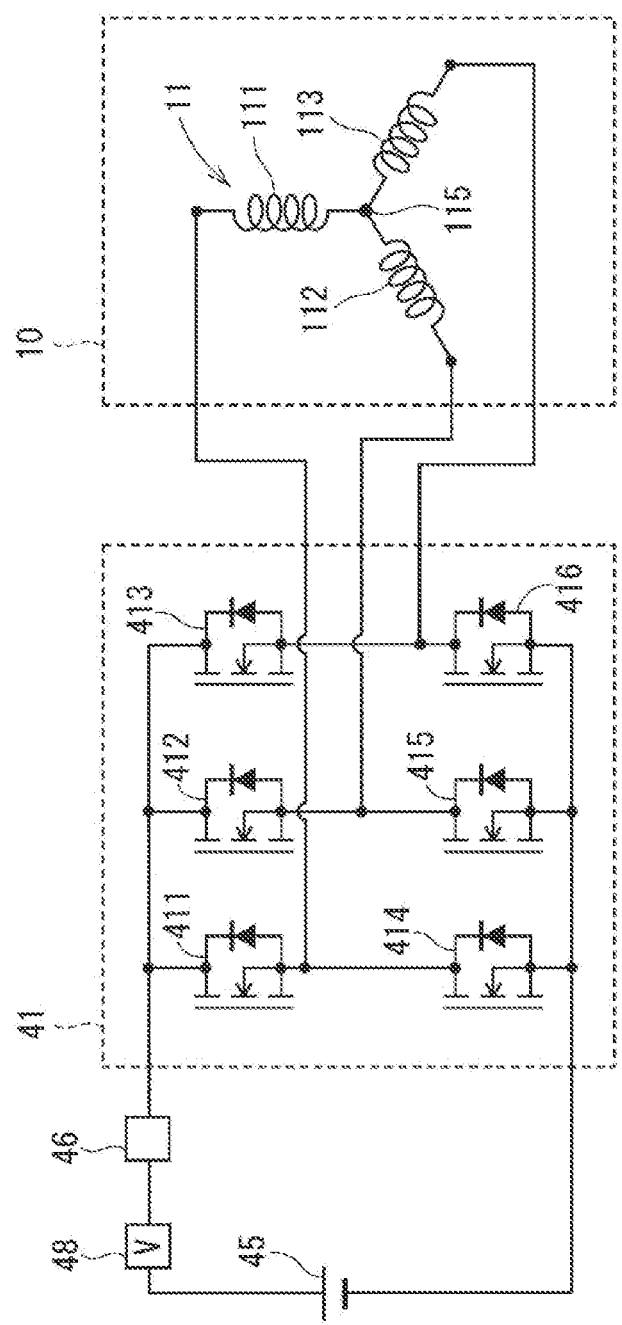
FIG. 3 is a circuit diagram showing a motor and a drive circuit according to the first embodiment.
Figure 4:
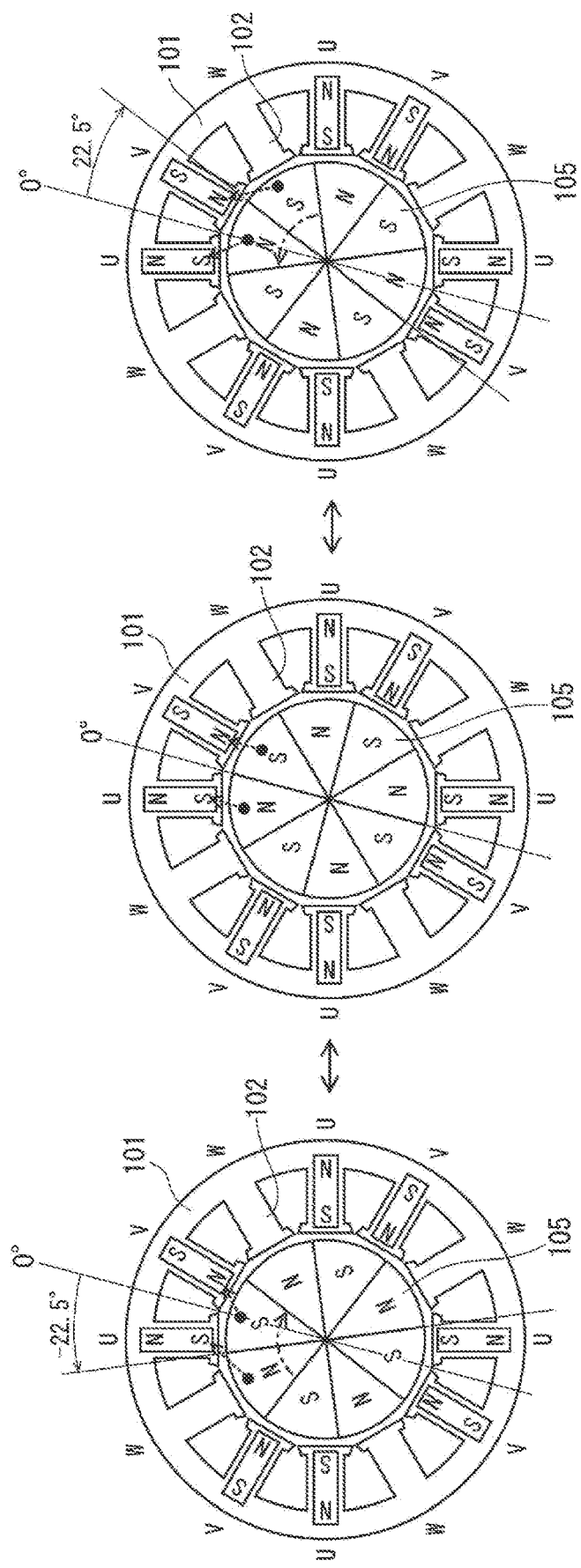
FIG. 4 is an explanatory diagram for explaining the torque generated according to the motor phase when a fixed phase is energized according to the first embodiment.

The motor 10 rotates when an electric power is supplied from a battery 45 (see FIG. 3) mounted on a vehicle (not shown), and functions as a driving source of the shift range switching mechanism 20. The motor 10 is configured to change an amount of current by a feedback control and is configured to manipulate a command for each phase. The motor 10 of the present embodiment is a permanent magnet type DC brushless motor. As shown in FIGS. 3 and 4, the motor 10 has a stator 101, a rotor 105, and a winding set 11. The winding set 11 has a U-phase coil 111, a V-phase coil 112, and a W-phase coil 113, and is wound around salient poles 102 of the stator 101. A permanent magnet is provided on the rotor 105. In the present embodiment, the number of salient poles of the stator 101 is 12, and the number of magnetic poles of the rotor 105 is 8.

As shown in FIG. 2, an encoder 13 detects a rotational position of the rotor 105 of the motor 10. The encoder 13 is, for example, a magnetic rotary encoder and is made up of a magnet that rotates integrally with the rotor 105, a magnetic detection hall integrated circuit IC, and the like. The encoder 13 outputs an encoder signal, which is an A phase and B phase pulse signal, at each predetermined angle in synchronization with the rotation of the rotor 105.

A decelerator 14 is provided between a motor shaft of the motor 10 and an output shaft 15 to decelerate the rotation of the motor 10 and output the decelerated rotation to the output shaft 15. The rotation of the motor 10 is thus transmitted to the shift range switching mechanism 20. An output shaft sensor 16 for detecting an angle of the output shaft 15 is provided on the output shaft 15. The output shaft sensor 16 is, for example, a potentiometer.

As shown in FIG. 1, the shift range switching mechanism 20 includes a detent plate 21, a detent spring 25 and the like. The shift range switching mechanism 20 transmits a rotational drive force output from the decelerator 14 to a manual valve 28 and a parking lock mechanism 30.

The detent plate 21 is fixed to the output shaft 15 and driven by the motor 10. The detent plate 21 has a pin 24 protruding in parallel with the output shaft 15. The pin 24 is connected to a manual valve 28. The detent plate 21 is driven by the motor 10, whereby the manual valve 28 reciprocates in an axial direction. That is, the shift range switching mechanism 20 converts the rotational motion of the motor 10 into a linear motion and transmits the linear motion to the manual valve 28. The manual valve 28 is provided on a valve body 29. When the manual valve 28 reciprocates in the axial direction, a hydraulic supply path to a hydraulic clutch (not shown) is switched, and an engagement state of the hydraulic clutch is switched. In this way, the shift range is switched.

On the detent spring 25 side of the detent plate 21, four recesses 22 for holding the manual valve 28 at positions corresponding to the respective ranges are provided. The recesses 22 each correspond to each of the shift ranges of D (drive), N (neutral), R (reverse), and P (park) ranges from a proximal end of the detent spring 25.

The detent spring 25 is an elastically deformable plate-like member, and is provided with a detent roller 26 at a tip of the detent spring 25. The detent roller 26 fits into one of the recesses 22. The detent spring 25 urges the detent roller 26 toward a rotation center of the detent plate 21. When a rotational force equal to or greater than a predetermined force is applied to the detent plate 21, the detent spring 25 is elastically deformed, and the detent roller 26 moves in the recesses 22. When the detent roller 26 is fitted to any of the recesses 22, swing of the detent plate 21 is regulated. Accordingly, an axial position of the manual valve 28 and a state of the parking lock mechanism 30 are determined to fix a shift range of an automatic transmission 5.

The parking lock mechanism 30 includes a parking rod 31, a conical member 32, a parking lock pawl 33, a shaft part 34 and a parking gear 35. The parking rod 31 is formed in a substantially L-shape. The parking rod 31 is fixed to the detent plate 21 on a side of one end 311. The conical member 32 is provided to the other end 312 of the parking rod 31. The conical member 32 is formed to reduce in diameter toward the other end 312. When the detent plate 21 rotates in the direction in which the detent roller 26 fits into the recess corresponding to the P range, the conical member 32 moves in the direction of the arrow P.

The parking lock pole 33 comes into contact with a conical surface of the conical member 32 and is provided so as to be swingable around the shaft part 34. On the parking gear 35 side of the parking lock pole 33, a protrusion 331 that can mesh with the parking gear 35 is provided. When the conical member 32 moves in the direction of the arrow P due to the rotation of the detent plate 21, the parking lock pole 33 is pushed up and the protrusion 331 and the parking gear 35 mesh with each other. On the other hand, when the conical member 32 moves in the direction of the arrow NotP, the meshing between the protrusion 331 and the parking gear 35 is released.

The parking gear 35 is provided on an axle (not shown) and is enabled to mesh with the protrusion 331 of the parking lock pawl 33. When the parking gear 35 meshes with the protrusion 331, rotation of the axle is restricted. When the shift range is one of the ranges (Not P range) other than the P range, the parking gear 35 is not locked by the parking lock pawl 33. Therefore, the rotation of the axle 95 is not restricted by the parking lock mechanism 30. When the shift range is the P range, the parking gear 35 is locked by the parking lock pawl 33 and the rotation of the axle is restricted.

As shown in FIGS. 2 and 3, the shift range control device 40 includes a drive circuit 41, an ECU 50, and the like. The drive circuit 41 is a three-phase inverter that switches the energization of the winding set 11, and switching elements 411 to 416 are bridge-connected to each other. The switching elements 411 and 414 are paired and belong to U phase. The switching elements 411 and 414 have a connection point therebetween, and the connection point is connected with one end of an U phase coil 111. The switching elements 412 and 415 are paired and belong to V phase. The switching elements 412 and 415 have a connection point therebetween, and the connection point is connected with one end of a V phase coil 112. The switching elements 413 and 416 are paired and belong to W phase. The switching elements 413 and 416 have a connection point therebetween, and the connection point is connected with one end of a W phase coil 113. The other ends of the coils 111 to 113 are connected to each other at a connection portion 115.

A motor relay 46 is provided between the drive circuit 41 and the battery 45. When the motor relay 46 is turned on, power supply from the battery 45 to the motor 10 side is allowed, and when it is turned off, the power supply from the battery 45 to the motor 10 side is cut off. A voltage sensor 48 detects the battery voltage, which is the voltage of the battery 45.

ECU 50 is mainly composed of a microcomputer and the like, and internally includes, although not shown in the figure, a CPU, a ROM, a RAM, an I/O, a bus line for connecting these components, and the like. Each process executed by the ECU 50 may be software processing or may be hardware processing. The software processing may be implemented by causing a CPU to execute a program. The program may be stored beforehand in a material memory device such as a ROM, that is, in a readable non-transitory tangible storage medium. The hardware processing may be implemented by a special purpose electronic circuit.

As shown in FIG. 2, the ECU 50 controls the switching of the shift range by controlling the drive of the motor 10 based on a driver-requested shift range, a signal from a brake switch, a vehicle speed, and the like. The ECU 50 controls the drive of a shift hydraulic control solenoid 6 based on the vehicle speed, an accelerator opening degree, the driver-requested shift range, and the like. The shift hydraulic control solenoid 6 is controlled to manipulate a shift stage. The number of the shift hydraulic 14 control solenoids 6 is determined according to the shift stage or the like. According to the present embodiment, a singular ECU 50 performs the control to drive the motor 10 and the shift hydraulic control solenoid 6. It is noted that, the ECU may be divided into a motor ECU, which is for motor control to control the motor 10, and an AT-ECU, which is for solenoid control. Hereinafter, a drive control of the motor 10 will be mainly described.

The ECU 50 has an angle calculation unit 51 and a drive control unit 55. The angle calculation unit 51 counts pulse edges of each phase of an encoder signal output from the encoder 13, and calculates an encoder count value θen. In the present embodiment, the encoder 13 corresponds to the "rotation angle sensor", and the encoder count value θen is a value corresponding to the rotation position of the motor 10 and corresponds to the "motor angle".

The drive control unit 55 generates a drive signal related to the drive control of the motor 10 so that the encoder count value θen becomes the target count value θcmd set according to the target shift range. The generated drive signal is output to the drive circuit 41. The drive of the motor 10 is controlled by switching the switching elements 411 to 416 on and off according to the drive signal. In the present embodiment, the target count value θcmd corresponds to the "target angle".

When the target shift range is changed, the drive control unit 55 drives the motor 10 by feedback control, and when the encoder count value θen falls within a predetermined range including the target count value θcmd (for example, θcmd ±2 counts), the drive control unit 55 switches to the stop control from the feedback control so that the motor 10 is stopped. Hereinafter, when the encoder count value θen falls within a predetermined range including the target count value θcmd, it is defined as "reaching the target". Further, in the figure, the feedback is described as "F/B".

In the present embodiment, as the stop control, a stationary phase energization control to the two phases is performed by turning on the switching element on the upper side of one phase and the switching element on the lower side of the other one phase. For example, by turning on the switching elements 411 and 415, UV phase energization is performed in which a current flows through the paths of the switching element 411, the U-phase coil 111, the connection portion 115, the V-phase coil 112, and the switching element 415.

FIG. 4 illustrates the torque generated when the UV phase is energized in the fixed phase. In FIG. 4, the force attracted by the magnetic force of the stator 101 and the rotor 105 is indicated by a broken line arrow, and the generated torque thereof is indicated by a dashed line arrow.

When the UV phase is energized in the fixed phase, the rotor 105 side of the salient pole 102 around which the U-phase coil 111 is wound becomes the S pole, and the rotor 105 side of the salient pole 102 around which the V-phase coil 112 is wound becomes the N pole. Therefore, ideally, as shown in the center of the paper surface in FIG. 4, in the state where the N pole faces the salient pole 102 around which the U-phase coil 111 is wound, and the S pole faces the salient pole 102 around which the V-phase coil 112 is wound, the rotor 105 stops. The phase of the rotor 105 in this state is set to 0°.

In the present embodiment, a DC brushless motor is used as the motor 10, and since the rotor 105 has a permanent magnet, the rotor 105 vibrates around a phase of 0° due to the action and reaction force of the magnet. Hereinafter, as appropriate, the phase 0° shown in the center of the paper surface of FIG. 4 is set as the vibration center. No torque is generated when the rotor 105 is at the center of vibration. The lower side of the paper surface of FIG. 4 shows a state of the phase of −22.5°, and the upper side of the paper surface shows a state of the phase of 22.5°. When the phase is ±45°, the U phase which is the S pole faces the S pole of the rotor 105 and the V phase which is the N pole faces the N pole of the rotor 105 face each other. Therefore they repel each other, and no torque is generated.

As shown on the lower side of the paper surface in FIG. 4, when the motor phase is negative, the torque in a forward rotation direction is generated. Therefore, when the rotor 105 is rotating in a backward rotation direction, the torque acts as a force to stop the vibration of the rotor 105, and when the rotor 105 is rotating in the forward rotation direction, the torque acts as a force to accelerate the rotor 105.

Further, as shown on the upper side of the paper, when the motor phase is positive, torque in the backward rotation direction is generated. Therefore, when the rotor 105 is rotating in the forward rotation direction, the torque acts as a force to stop the vibration of the rotor 105, and when the rotor 105 is rotating in the backward rotation direction, the torque acts as a force to accelerate the rotor 105.

That is, when the rotor 105 is moving away from the center of vibration, the torque acts as a force to stop the vibration of the rotor, and when the rotor 105 is moving toward the center of vibration, the torque acts as a force to accelerate the rotor 105. Hereinafter, the torque acting as a force to stop the vibration is referred to as a brake torque Tb, and the torque acting as a force to vibrate is referred to as an acceleration torque Ta.

Figure 5:
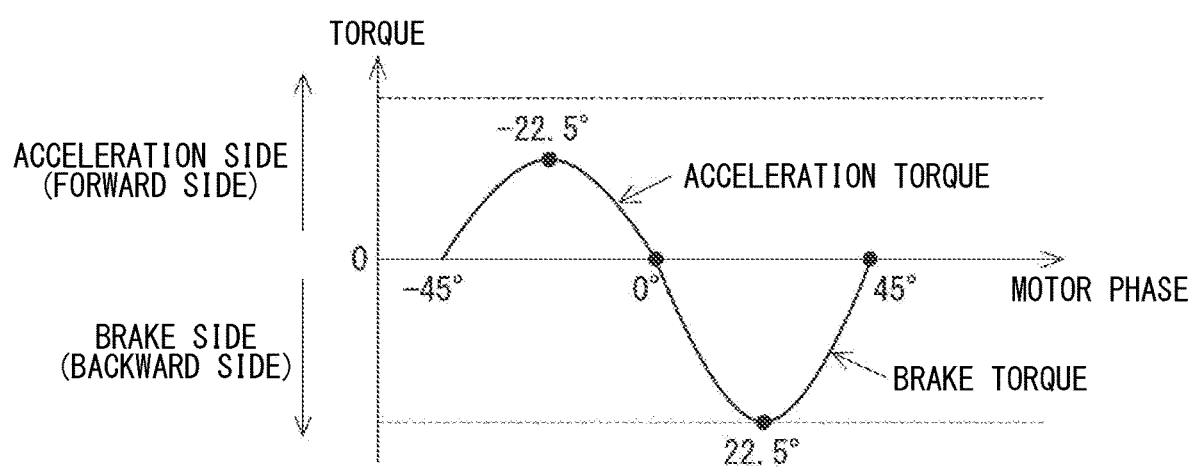
FIG. 5 is an explanatory diagram illustrating an acceleration torque and a brake torque when the fixed phase is energized according to the first embodiment.

As shown in FIG. 5, when the rotor 105 rotates in the forward rotation direction, the rotor 105 rotates in the direction toward the vibration center in the phase range of −45° to 0°, and the torque at this time becomes an acceleration torque. Further, in the phase range of 0° to 45°, the rotor 105 rotates in a direction away from the vibration center, and the torque at this time becomes a brake torque. The brake torque is generated by a counter electromotive force. Further, since the brake torque is larger than the acceleration torque when the fixed phase is energized, the vibration energy is reduced by the difference therebetween.

Figure 12:
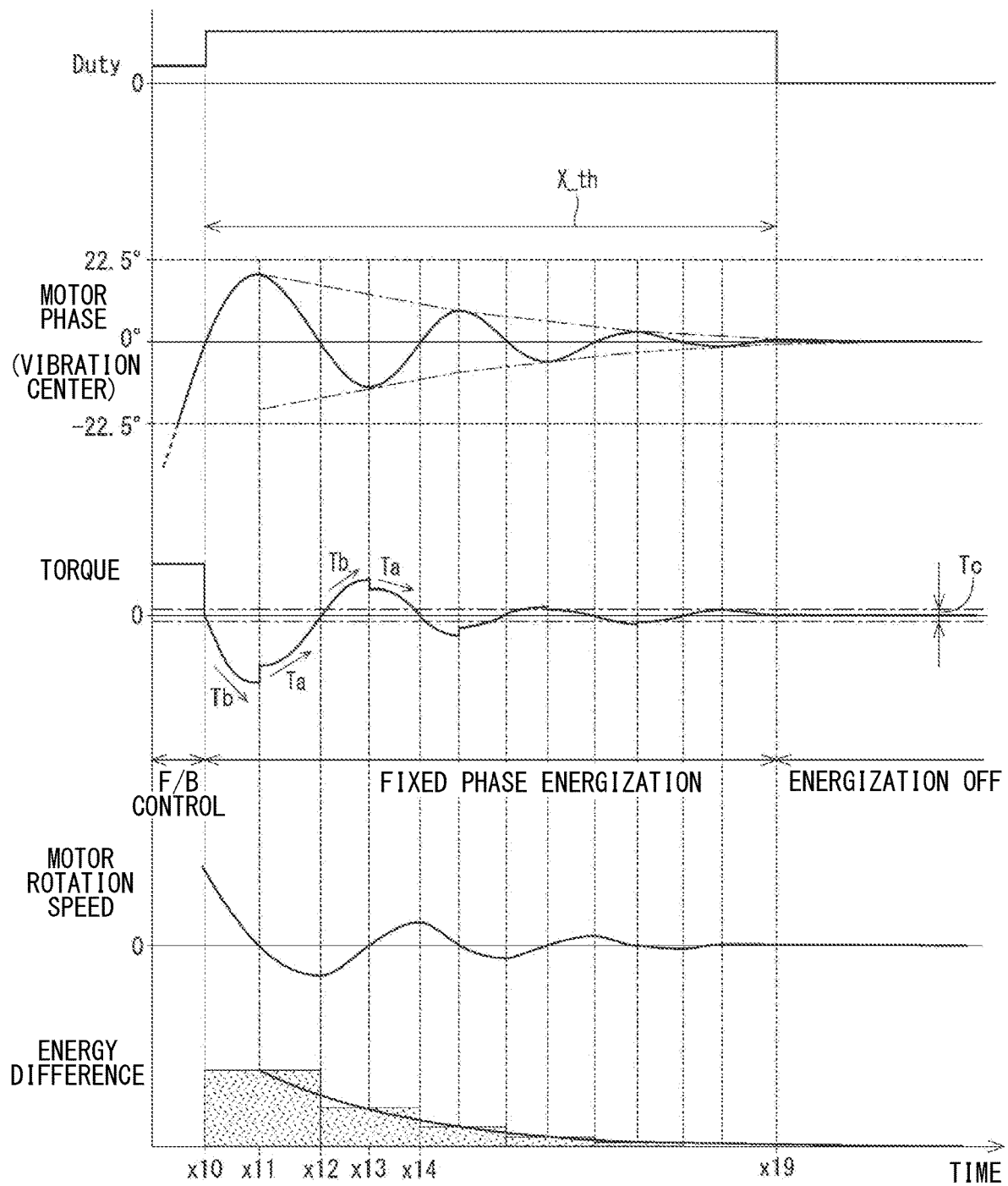
FIG. 12 is a time chart illustrating fixed phase energization control according to a reference example.

FIG. 12 shows a case where the fixed phase energization control is performed with a constant duty as a reference example. FIG. 12 shows a duty, a motor phase, a torque, a motor rotation speed, and an energy difference are shown from the top, with the common time axis as the horizontal axis. FIG. 6, FIG. 10, FIG. 13 and FIG. 14 are the same except that the energy difference is not shown.

When the encoder count value θen reaches the target at time x10, the state in which PWM control is performed as feedback control is switched to fixed phase energization control. Further, the fixed phase energization is ended at the time x19 after a determination time X_th elapses from the start of the fixed phase energization, and the energization to the motor 10 is turned off.

In FIG. 12 and the like, the phase of the rotor 105 at the start of the fixed phase energization control is set to 0°, and is set as the vibration center. Since the rotor 105 rotates in the direction away from the vibration center between the time x10 and the time x11, a brake torque is generated in the rotor 105. Since the rotor 105 rotates in the direction toward the vibration center between the time x11 and the time x12, an acceleration torque is generated in the rotor 105. Further, the motor rotation speed peaks when the phase is 0, and becomes 0 when the rotation direction of the rotor 105 is switched.

Brake torque is generated between time x12 and time x13, acceleration torque is generated between time x13 and time x14. Namely, brake torque and acceleration torque are alternately generated according to the vibration of the rotor 105.

Further, in the chart showing the torque, the area corresponding to the brake torque from the time x10 to the time x11 corresponds to the brake energy, and the area corresponding to the acceleration torque from the time x11 to the time x12 corresponds to the acceleration energy. The difference obtained by subtracting the acceleration energy from the time x11 to the time x12 from the brake energy from the time x10 to the time x11 is defined as the energy difference from the time x10 to the time x12, and the difference energy is schematically shown by a satin square. Similarly, the difference obtained by subtracting the acceleration energy from the time x13 to the time x14 from the brake energy from the time x12 to the time x13 is defined as the energy difference from the time x12 to the time x14.

As shown in FIG. 12, in the fixed phase energization control, when the duty is constant, the brake torque is larger than the acceleration torque, and the vibration of the rotor 105 converges due to the difference. However, if the duty is constant, relatively large brake torque and acceleration torque continue to be generated, so that it takes time for the vibration to converge.

Figure 13:
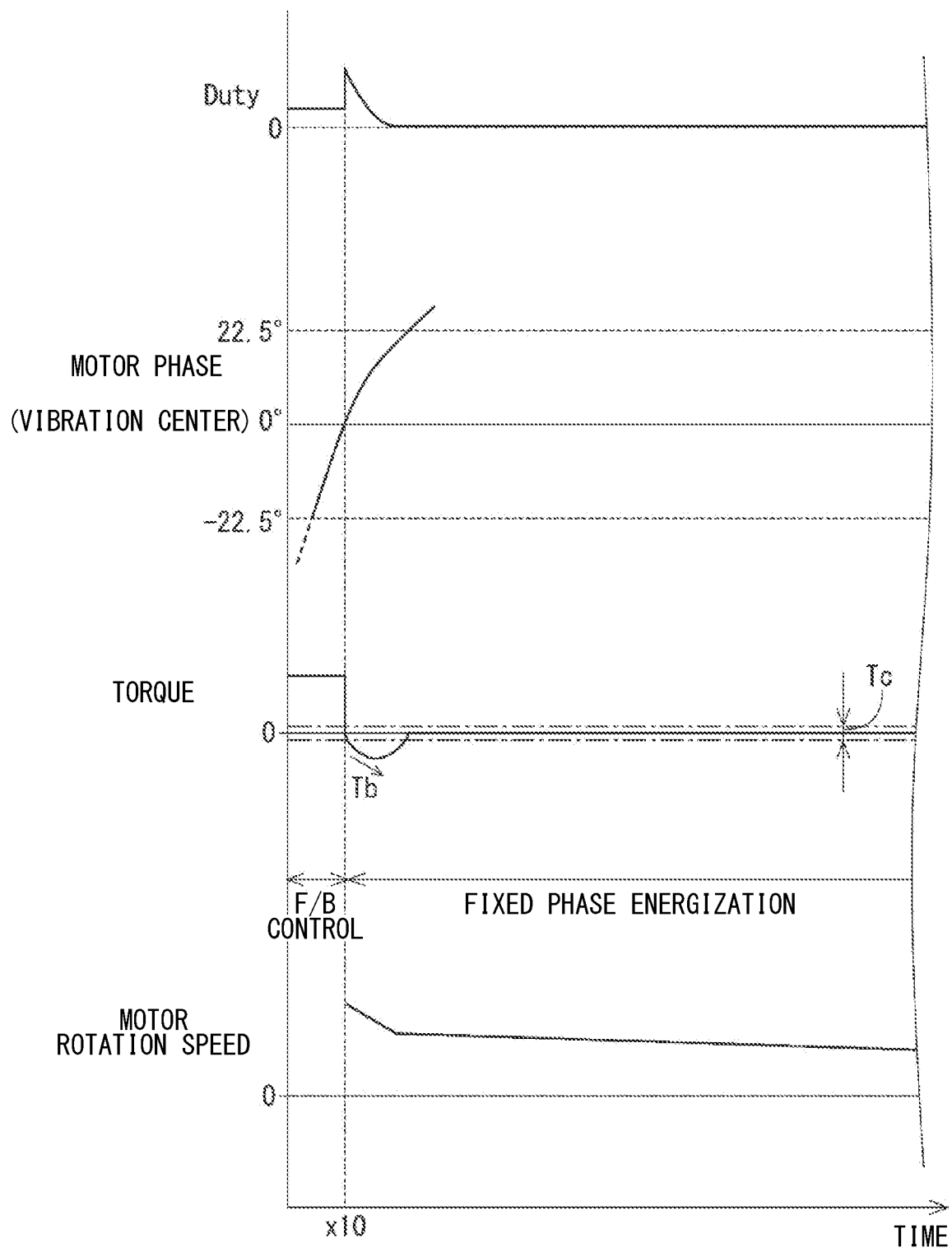
FIG. 13 is a time chart illustrating fixed phase energization control according to the reference example.
Figure 14:
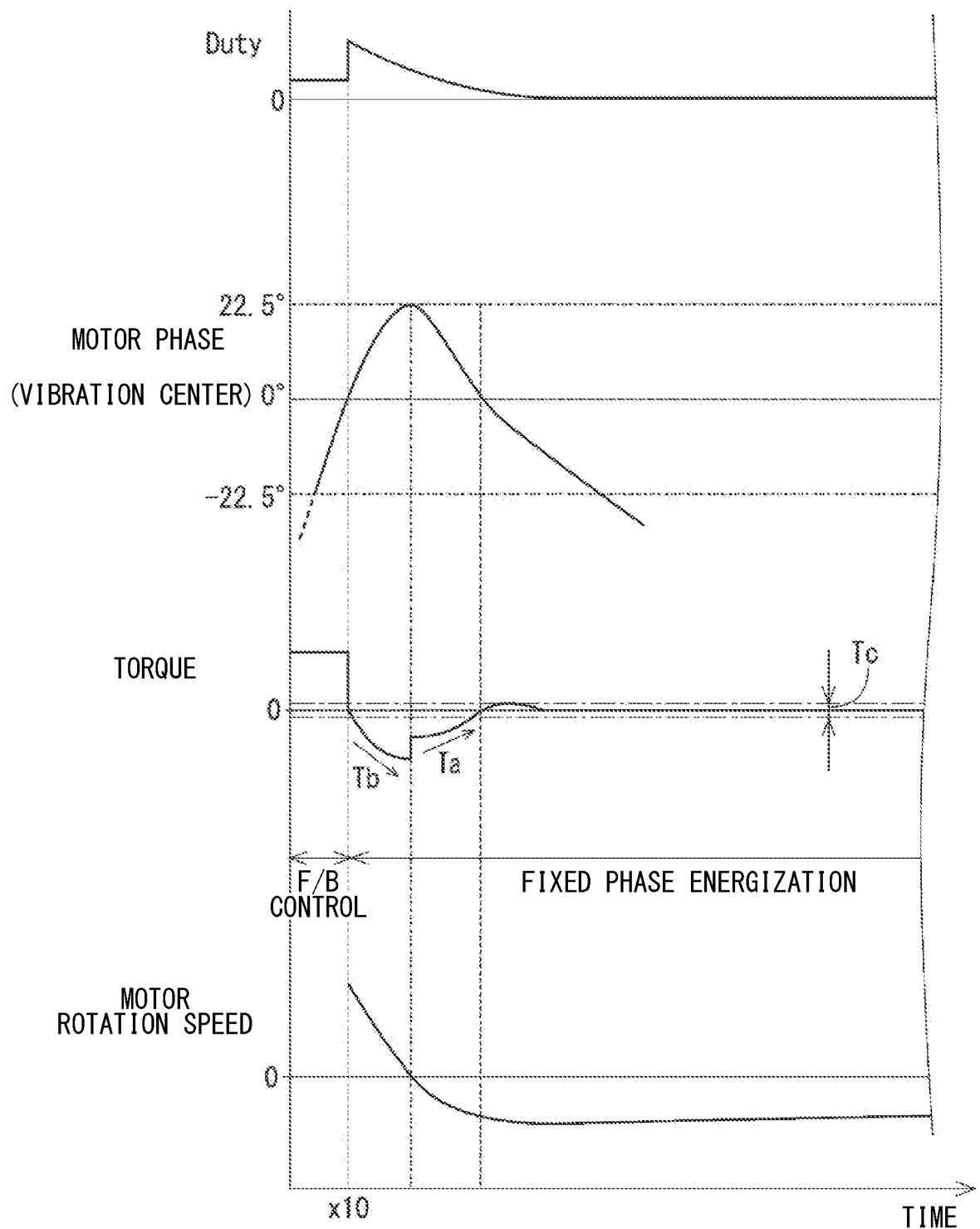
FIG. 14 is a time chart illustrating fixed phase energization control according to the reference example.

On the other hand, as in the reference examples shown in FIGS. 13 and 14, if the duty is suddenly reduced in the fixed phase energization control, the rotor 105 cannot be held at a predetermined position according to the energizing phase. At this time, the motor rotation speed does not become 0 and the motor is stepped out. FIG. 13 is an example of overshooting beyond the target count value θcmd, and FIG. 14 is an example of undershooting in the direction returning from the target count value θcmd. In addition, in FIGS. 12 to 14, it is described assuming that the duty at the time of feedback control immediately before switching to the fixed phase energization is constant.

Figure 6:
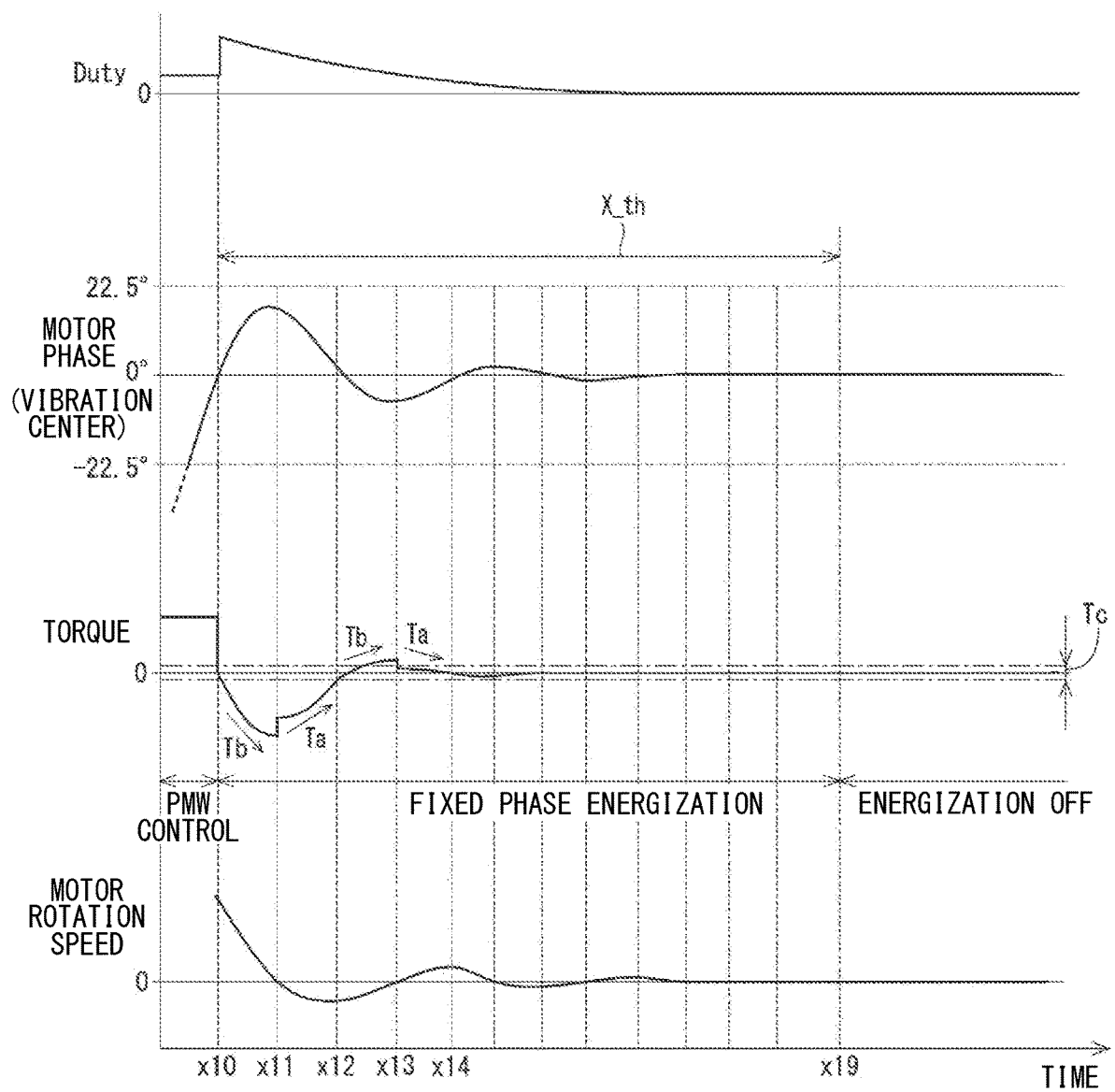
FIG. 6 is a time chart illustrating an energization control of the fixed phase according to the first embodiment.

In the present embodiment, even if the applied current is reduced in time by the energy difference (see FIG. 12), which is the difference between the brake energy and the acceleration energy, it is utilized that the rotor 105 does not step out from a predetermined position according to the energizing phase. Therefore, as shown in FIG. 6, in the fixed phase energization control, the duty is gradually reduced in order to reduce the current. The duty reduction rate is set according to the brake energy and the acceleration energy. Specifically, in order to avoid step-out, the amount of current reduction is set according to the motor characteristics so as not to exceed the amount of energization required to generate torque according to the energy difference. As a result, the vibration of the rotor 105 can be quickly converged without stepping out from the predetermined stop position according to the energizing phase. Further, if the amplitude of the torque vibration is equal to or less than the amplitude of the cogging torque Tc of the motor 10, the motor 10 is stopped at a predetermined position by the cogging torque Tc even if the energization is turned off. For simplification of explanation, the vibration periods are the same in FIGS. 6 and 12, but may be different. The same applies to FIG. 10 described later.

Figure 7:
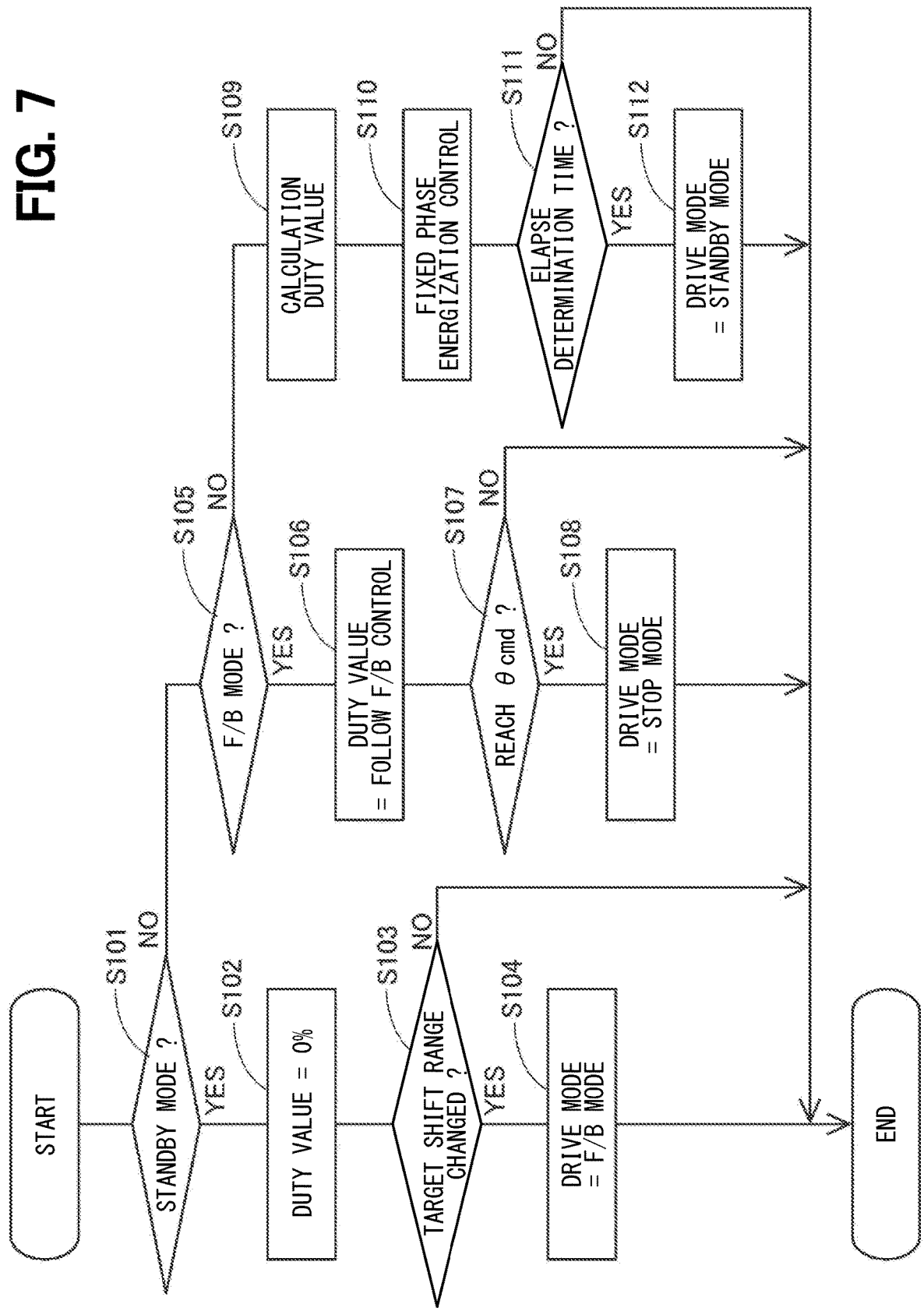
FIG. 7 is a flowchart illustrating a motor control process according to the first embodiment.

The motor control process of the present embodiment will be described based on the flowchart of FIG. 7. This process is executed by the ECU 50 at a predetermined cycle (for example, 1 [ms]). Although a drive mode selection and drive control are described here as a series of processes, a part of the processes according to FIG. 7 may be executed as a separate process. Further, when a start switch of the vehicle such as an ignition switch is turned on, a standby mode is set after a computer is initialized. Hereinafter, "step" in step S101 is omitted, and is simply referred to as a symbol "S." The same applies to the other steps.

In S101, the ECU 50 determines whether or not the drive mode is the standby mode. When it is determined that the drive mode is not the standby mode (S101: NO), the process proceeds to S105. When it is determined that the drive mode is the standby mode (S101: YES), the process proceeds to S102, the duty value is set to 0%, and the switching elements 411 to 416 are turned off.

In S103, the ECU 50 determines whether or not the target shift range has been changed to another. If it is determined that the target shift range has not been changed (S103: YES), the process of S104 is not performed and the standby mode is continued. When it is determined that the target shift range has been changed (S103: YES), the process proceeds to S104 and the drive mode is switched to a feedback mode.

In S105, the ECU 50 determines whether or not the drive mode is the feedback mode. When it is determined that the drive mode is not the feedback mode (S105: NO), that is, when the drive mode is the stop mode, the process proceeds to S109. When it is determined that the drive mode is the feedback mode (S105: YES), the process proceeds to S106. In S106, the drive control unit 55 drives the motor 10 by feedback control. A duty value at this time follows a speed feedback control.

In S107, the ECU 50 determines whether or not the encoder count value θen has reached the target count value θcmd. Here, when the encoder count value θen is within a predetermined range including the target count value θcmd, a positive judgment is made. When it is determined that the encoder count value θen has not reached the target count value θcmd (S107: NO), the process of S108 is not performed and the feedback mode is continued. When it is determined that the encoder count value θen has reached the target count value θcmd (S107: YES), the process proceeds to S108 and the drive mode is shifted to the stop mode. In addition, the elapsed time X from the start of the stop mode is clocked.

In S109, which shifts to the case where the drive mode is the stop mode, the drive control unit 55 calculates the duty value Df in the fixed phase energization control according to the elapsed time X from the start of the fixed phase energization. In the present embodiment, the duty value Df is calculated according to the elapsed time X, for example, based on the map of FIG. 8. An intermediate value in the above-mentioned duty value is interpolated linearly or nonlinearly. Further, the duty value Df may be calculated by an equation (1) or an equation (2). In the equation (1), 0<a<1 is set, and in the equation (2), b>1 is set. The calculation formula may be selected according to the motor characteristics. In S110, the drive control unit 55 performs the fixed phase energization control at the duty value Df calculated in S109.

$$Df=a^x \quad (1)$$

$$Df=b^{(1/x)} \quad (2)$$

In S111, the ECU 50 determines whether or not the elapsed time X from the start of the stop control has elapsed the determination time X_th. The determination time X_th is set according to the time required for the torque generated by energizing the motor 10 to be equal to or less than the cogging torque Tc. Further, in the present embodiment, when the determination time X_th elapses from the start of the stop control, it is considered that "the torque generated by energizing the motor has become the cogging torque Tc or less". When it is determined that the elapsed time X from the start of the stop control does not elapse the determination time X_th (S111: NO), the process of S112 is not performed and the stop mode is continued. When it is determined that the elapsed time X from the start of the stop control has passed the determination time X_th (S111: YES), the process proceeds to S112, the drive mode is switched to the standby mode, and all the switching elements 411 to 416 are turned off so as to tur off the power supply to the motor 10.

Figure 9:
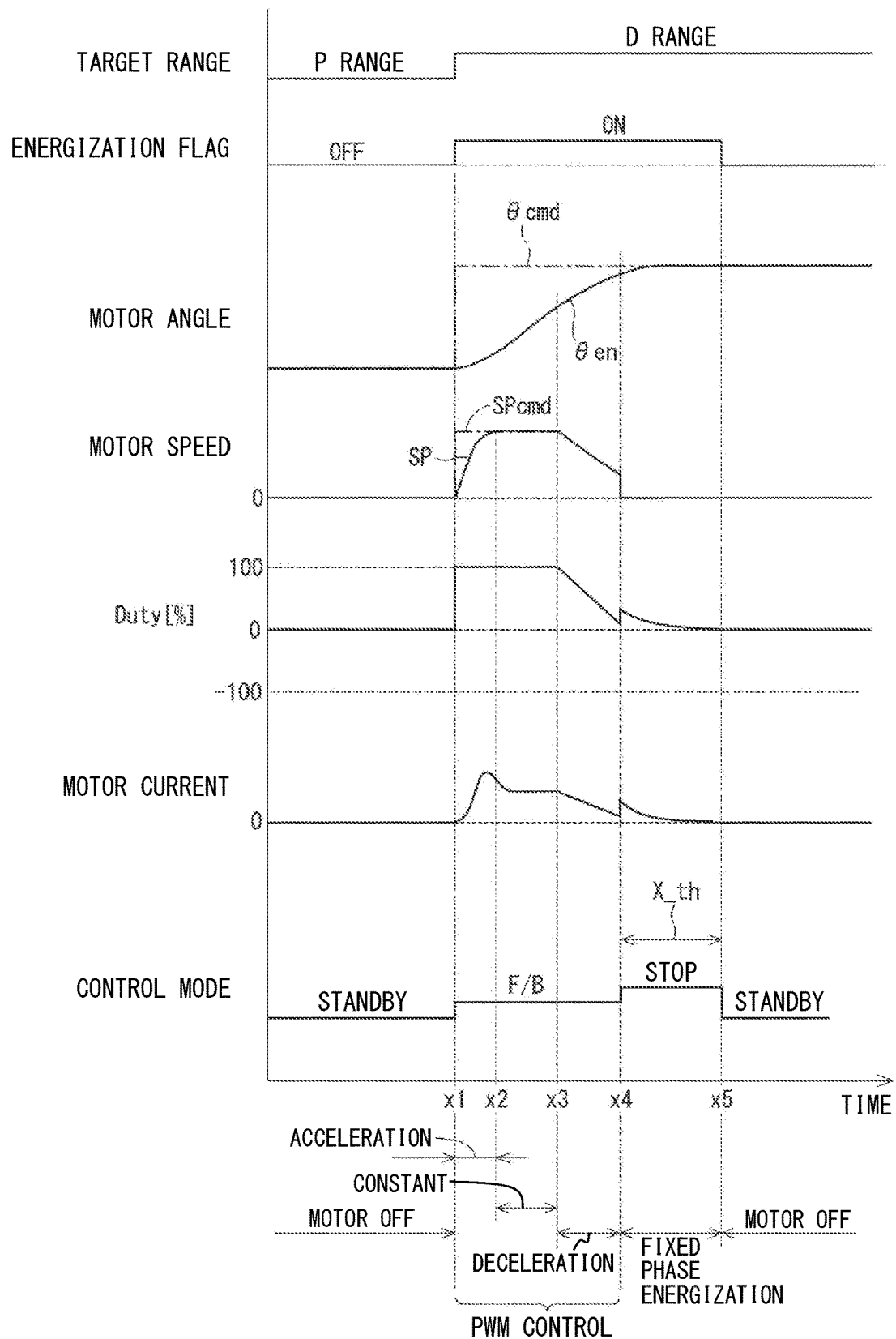
FIG. 9 is a time chart for explaining motor control process according to the first embodiment.

The motor control process of the present embodiment will be described with reference to the time chart of FIG. 9. FIG. 9 shows the target range, the energization flag, the motor angle, the motor speed, the duty, the motor current, and the control mode from the top, with the common time axis as the horizontal axis. As for the motor angle, the encoder count value θen is indicated by a solid line, and the target count value θcmd is indicated by an alternate long and short dash line. The motor speed SP is the motor rotation speed, the actual value is shown by a solid line, and the target speed SPcmd is shown by an alternate long and short dash line. In the present embodiment, the feedback control includes an acceleration control, a constant control and a deceleration control. The duty is the ratio of the on-time in one cycle, and in the present embodiment, the value in the energization order when the motor 10 is rotated forward is defined as positive, and the value in the energization order when the motor 10 is reversed is defined as negative.

When the target range is switched from the P range to the D range at time x1, the control mode is set to the feedback mode. In the present embodiment, the motor 10 is driven by PWM control. From time x1 to time x2, the motor 10 is accelerated by acceleration control so that the motor speed SP becomes the target speed SPcmd. When the motor speed SP reaches the target speed SPcmd at time x2, the motor speed SP is maintained by constant control. Further, when the encoder count value θen approaches the target count value θcmd, the constant control is switched to the deceleration control at time x3, and the motor 10 is decelerated.

When the encoder count value θen falls within a predetermined range including the target count value θcmd at time x4, the drive mode is switched from the feedback mode to the stop mode, and the motor 10 is stopped by the fixed phase energization.

In the present embodiment, a gradual change slope of the duty is determined according to a counter electromotive force characteristic so that the kinetic energy and the vibration energy of the motor 10 when entering the stop mode can be consumed. In the present embodiment, the deceleration control is shifted to the fixed phase energization without reversing the motor 10. Further, the duty at the start of the fixed phase energization is larger than the duty at the end of the deceleration control. The duty value Df at the start of the fixed phase energization is set to an arbitrary value (for example, 40%) lower than 100% according to the upper limit current that can be energized by the fixed phase energization. Then, by decreasing the duty value Df exponentially, the motor current decreases exponentially. At the time x5 when the determination time X_th has elapsed from the start of the fixed phase energization, the control mode is switched from the stop mode to the standby mode, and the energization of the motor 10 is turned off.

As described above, the shift range control device 40 of the present embodiment switches the shift range by controlling the drive of the motor 10, and includes an angle calculation unit 51 and a drive control unit 55. The angle calculation unit 51 calculates the encoder count value θen based on the signal from the encoder 13 that detects the rotation position of the motor 10. The drive control unit 55 drives the motor 10 so that the encoder count value θen becomes the target count value θcmd according to the target shift range, and when the encoder count value θen reaches the target count value θcmd, the drive control unit 55 stops the rotor 105 by the fixed phase energization control.

When the rotor 105 vibrates with respect to the stop position according to the energized phase during the fixed phase energization control, the drive control unit 55 maintains a state in which the brake torque Tb, which is the torque generated when moving away from the center of vibration, is larger than the acceleration torque Ta, which is the torque generated when moving toward the center of vibration, and reduces the current that energizes the motor 10 based on the difference between the brake torque Tb and the acceleration torque Ta. In the present embodiment, the current is reduced by gradually changing the duty. As a result, the rotor 105 can be stopped at the target stop position quickly and appropriately.

The rotor 105 has a permanent magnet. In the fixed phase energization control, the drive control unit 55 reduces the current so that the torque generated by energizing the motor 10 becomes the cogging torque Tc or less, and ends the fixed phase energization control after the torque generated by energizing the motor 10 becomes the cogging torque Tc or less. After that, the drive control unit 55 turns off the energization of the motor 10. By setting the torque generated by energizing the motor 10 to be equal to or less than the cogging torque Tc, the motor phase can be maintained by the cogging torque Tc, so that the motor 10 can be stopped at an appropriate position.

The drive control unit 55 exponentially reduces the current in the fixed phase energization control. As a result, the time required for the fixed phase energization can be shortened, and the power consumption required for stopping the motor 10 can be reduced.

Second Embodiment

Figure 10:
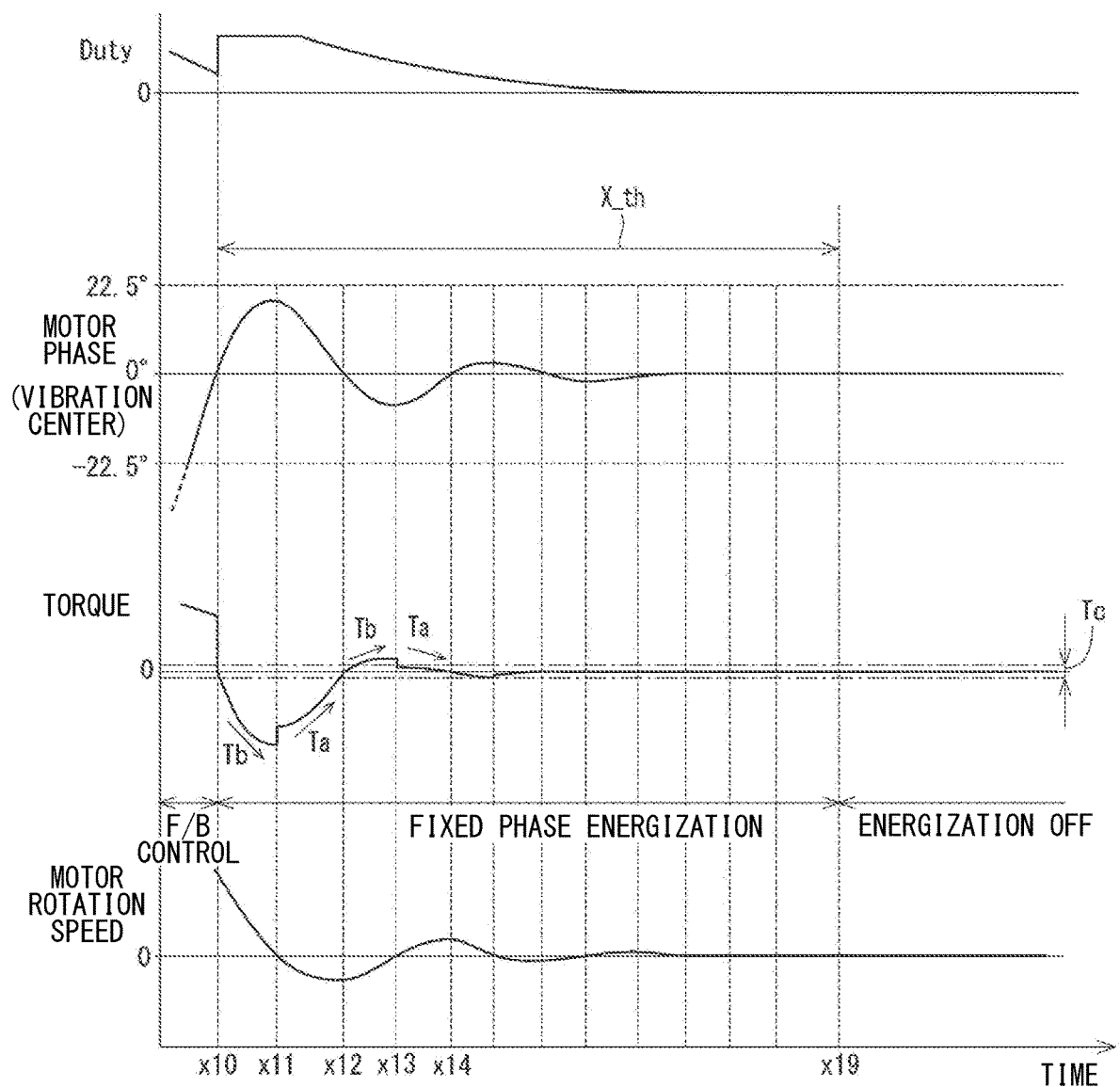
FIG. 10 is a time chart for explaining motor control processing according to a second embodiment.
Figure 11:
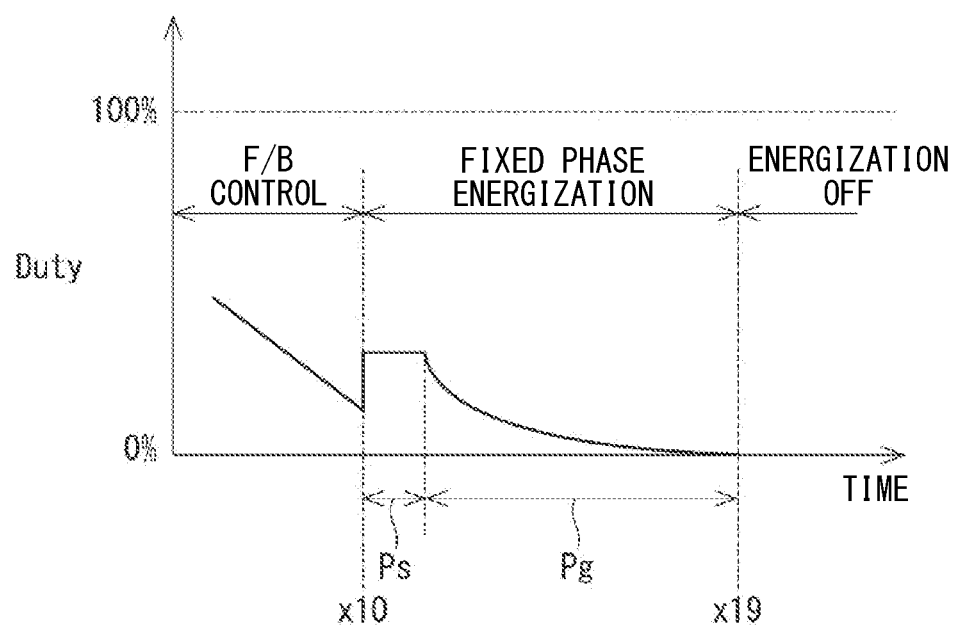
FIG. 11 is a time chart illustrating a duty when the fixed phase is energized according to the second embodiment.

A second embodiment is shown in FIGS. 10 and 11. FIG. 11 shows an enlarged view of the duty before and after the transition from the feedback control to the stop control. As shown in FIGS. 10 and 11, in the present embodiment, when the encoder count value θen reaches a predetermined range including the target count value θcmd, the constant duty period Ps keeps the duty constant and the duty is gradually changed in the gradual change duty period Pg after the constant duty period Ps elapses.

The duty of the constant duty period Ps is set according to the motor current capable of consuming the kinetic energy of the motor 10 at the time of entering the stop mode. In the present embodiment, the upper limit current that can be energized by the fixed phase energization is set. Further, the length of the constant duty period Ps is set according to the kinetic energy and the duty at the time of entering the stop control so that the kinetic energy of the motor 10 at the time of entering the stop control can be consumed. Further, the duty slope in the gradual change duty period Pg is set so that the vibration energy of the rotor 105 can be consumed.

In the present embodiment, in the fixed phase energization control, the drive control unit 55 reduces the current by gradually changing the duty after the constant duty control of energizing with a constant duty. Further, at least one of the duty and the period in the constant duty control is set according to the kinetic energy at the time of entering the stop control. As a result, the motor 10 can be reliably stopped at the target position.

Other Embodiments

In the above embodiment, the motor is driven by speed feedback control so that the motor angle becomes the target angle. In another embodiment, the control method for driving the motor angle to the target angle may be any method.

In the above embodiments, the motor is a DC brushless motor. In other embodiment, the motor may be something other than a DC brushless motor, such as a switched reluctance motor. In the above embodiment, the motor driver as the drive circuit is a three-phase inverter. In other embodiments, the drive circuit may be configured by being capable of switching the energization of the motor windings. In the above embodiment, one set of a motor winding and a drive circuit is provided. In other embodiments, a plurality of sets of motor windings and drive circuits may be provided.

In the above embodiment, the rotation angle sensor that detects the rotation angle of the motor is an encoder. According to another embodiment, various other devices, such as a resolver, may be employable as the rotation angle sensor alternatively to the encoder. In the present embodiment, the potentiometer was illustrated as an output shaft sensor. In another embodiment, the output shaft sensor may be any sensor. Further, the output shaft sensor may be omitted.

According to the embodiments described above, the four recess portions are formed in the detent plate. According to another embodiment, the number of the recess portions is not limited to four and may be another number. For example, a configuration may be employable where the number of the recess portions of the detent plate is two and where the P range and the not P range are switchable therebetween. The shift range switching mechanism and the parking lock mechanism or the like may be different from those in the embodiments described above.

In the above embodiments, the decelerator is placed between the motor shaft and the output shaft. Although the details of the decelerator are not described in the embodiments described above, it may be configured by using, for example, a cycloid gear, a planetary gear, a spur gear that transmits torque from a reduction mechanism substantially coaxial with the motor shaft to a drive shaft, or any combination of these gears. As another embodiment, the decelerator between the motor shaft and the output shaft may be omitted, or a mechanism other than the decelerator reducer may be provided.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium. The present disclosure is not limited to the embodiment described above but various modifications may be made within the scope of the present disclosure.

The present disclosure has been described in accordance with embodiments. However, the present disclosure is not limited to this embodiment and structure. This disclosure also encompasses various modifications and variations within the scope of equivalents. Furthermore, various combination and formation, and other combination and formation including one, more than one or less than one element may be made in the present disclosure.

What is claimed is:

1. A shift range control device for switching a shift range by controlling drive of a motor, the shift range control device comprising:
   an angle calculation unit configured to calculate a motor angle based on a signal from a rotation angle sensor that detects a rotation position of the motor; and
   a drive control unit configured to drive the motor so that the motor angle becomes a target angle according to a target shift range, and configured to stop a rotor by a fixed phase energization control when the motor angle reaches the target angle,
   wherein
   the drive control unit
      maintains a state in which a brake torque, which is torque generated when moving away from a center of vibration, is larger than an acceleration torque, which is the torque generated when moving toward the center of vibration, when the rotor vibrates with respect to a stop position according to an energized phase during the fixed phase energization control, and
      reduces current energizing the motor according to a difference between the brake torque and the acceleration torque.

2. The shift range control device according to claim 1, wherein
   the rotor has a permanent magnet, and
   the drive control unit reduces the current so that the torque generated by energizing the motor is equal to or less than a cogging torque, terminates the fixed phase energization control after the torque becomes less than or equal to the cogging torque, and turns off the energization of the motor.

3. The shift range control device according to claim 1, wherein the drive control unit reduces the current by gradually changing a duty after a constant duty control in which the current is energized at a constant duty in the fixed phase energization control.

4. The shift range control device according to claim 1, wherein
the drive control unit exponentially reduces the current in the fixed phase energization control.

5. A shift range control device for switching a shift range by controlling drive of a motor, the shift range control device comprising:
a computer including a processor and a memory that stores instructions configured to, when executed by the processor, cause the processor to
calculate a motor angle based on a signal from a rotation angle sensor that detects a rotation position of the motor;
drive the motor so that the motor angle becomes a target angle according to a target shift range, and stop a rotor by a fixed phase energization control when the motor angle reaches the target angle;
maintain a state in which a brake torque, which is torque generated when moving away from a center of vibration, is larger than an acceleration torque, which is the torque generated when moving toward the center of vibration, when the rotor vibrates with respect to a stop position according to an energized phase during the fixed phase energization control; and
reduce current energizing the motor according to a difference between the brake torque and the acceleration torque.

6. The shift range control device according to claim 5, wherein
the rotor has a permanent magnet, and
the computer causes the processor to
drive control unit reduces the current so that the torque generated by energizing the motor is equal to or less than a cogging torque,
terminate the fixed phase energization control after the torque becomes less than or equal to the cogging torque, and
turn off the energization of the motor.

7. The shift range control device according to claim 5, wherein
the computer causes the processor to reduce the current by gradually changing a duty after a constant duty control in which the current is energized at a constant duty in the fixed phase energization control.

8. The shift range control device according to claim 5, wherein
the computer causes the processor to exponentially reduce the current in the fixed phase energization control.

\* \* \* \* \*